（12）United States Patent
Rucklidge et al.

(10) Patent No.: US 6,295,371 B1
(45) Date of Patent: Sep. 25, 2001

(54) METHOD AND APPARATUS FOR IMAGE PROCESSING EMPLOYING IMAGE SEGMENTATION USING TOKENIZATION

(75) Inventors: William J. Rucklidge, Mountain View, CA (US); Daniel P. Huttenlocher, Ithaca, NY (US); Pedro Felzenswalb, Rio de Janeiro (BR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/177,194

(22) Filed: Oct. 22, 1998

(51) Int. Cl.[7] ..................................................... G06K 9/34
(52) U.S. Cl. ........................ 382/176; 358/462; 358/464
(58) Field of Search ................................... 382/173, 176, 382/177, 164, 180; 358/453, 455, 456, 462, 464, 466, 467

(56) References Cited

U.S. PATENT DOCUMENTS

| 4,466,121 | * | 8/1984 | Damen et al. ....................... 382/177 |
| 5,539,841 | | 7/1996 | Huttenlocher et al. . |
| 5,835,638 | | 11/1998 | Rucklidge et al. . |
| 5,848,185 | * | 12/1998 | Koga et al. ........................... 382/173 |
| 5,930,393 | * | 7/1999 | Ho et al. ............................... 382/177 |
| 6,026,182 | * | 2/2000 | Lee et al. ............................. 382/173 |
| 6,035,059 | * | 3/2000 | Kurosawa et al. .................... 382/164 |

OTHER PUBLICATIONS

Luc Vincent, "Morphological Algorithms", Harvard Robotics Laboratory, Technical Report No. 91–12, pp. 1–30.

* cited by examiner

Primary Examiner—Jon Chang
Assistant Examiner—Jingge Wu
(74) Attorney, Agent, or Firm—Fay, Sharpe, Fagan, Minnich & McKee, LLP

(57) ABSTRACT

A method for image processing including segmenting document images into text and continuous tone regions is provided. The method uses a token shape comparison and resultant data (e.g. shape recurrence) to determine which high-contrast regions of the image correspond to text or other symbols. The identified text is then separated from the image and processing ensues.

14 Claims, 6 Drawing Sheets

METHOD AND APPARATUS FOR IMAGE PROCESSING EMPLOYING IMAGE SEGMENTATION USING TOKENIZATION

CROSS-REFERENCE TO RELATED APPLICATIONS

The present application is related to commonly assigned U.S. Pat. No. 5,539,841 entitled "Method for Comparing Image Sections to Determine Similarity Therebetween", filed Apr. 27, 1995; commonly assigned U.S. application Ser. No. 08/652,864 entitled "Fontless Structured Document Image Representations for Efficient Rendering", filed May 23, 1996; commonly assigned U.S. application Ser. No. 08/752,497 entitled "Using Fontless Structured Document Image Representations to Render Displayed and Printed Documents at Preferred Resolutions", filed Nov. 8, 1996; commonly assigned U.S. application Ser. No. 08/655,546 entitled "Method and Apparatus for Comparing Symbols Extracted from Binary Images of Text", filed May 30, 1996; and, commonly assigned U.S. patent application Ser. No. 08/970,970 entitled "System for Performing Collective Symbol-based Compression of a Corpus of Document Images", filed Nov. 14, 1997. All of these related applications and the noted U.S. Patent No. 5,539,841 are hereby incorporated herein by this reference.

BACKGROUND OF THE INVENTION

This invention relates to a method for image processing employing image segmentation using tokenization. More particularly, the present invention is directed to a method for segmenting document images into text (or symbols) and continuous tone regions using a shape comparison, or tokenization, as an indicator of which high contrast regions of the image correspond to text. Such segmentation is useful for implementation of image processing techniques such as compression and decompression.

While the invention is particularly directed to the art of image processing including segmentation of images, and will thus be described with specific reference thereto, it will be appreciated that the invention may have usefulness in other fields and applications.

By way of background, image processing has gained considerable recognition in recent years. Unfortunately, however, it is still difficult for a computer to "look at" a scanned, color image and determine which parts of that image correspond to text and which parts correspond to continuous tone regions.

This is significant because segmenting images into text and continuous tone regions is useful from an image processing standpoint. Once text is separated out from the image, it can be more efficiently processed by way of Optical Character Recognition (OCR), for example, apart from the continuous tone regions.

In addition, where image compression and decompression are implemented, segmentation of the text from other parts of the image is important because continuous tone images can be stored at a lower resolution than text without visible degradation. Most known continuous tone, lossy compression methods result in blurred text because these compression methods do not effectively deal with high contrast regions of text.

Therefore, it would be extremely valuable to have an effective segmentation method that would determine parts of images that correspond to text and parts that do not. Known methods are deficient.

In this regard, known methods for segmenting images typically use pixel level statistics. That is, these methods consider an area or region of an image and make determinations based on contrast between pixels therein. For example, one of these known methods may determine that a high contrast area in a particular region being analyzed corresponds to text; however, such a method does not effectively deal with the situation where nontextual high contrast regions are present in the image. Therefore, images that are not text will be improperly treated as such, resulting in false positive results.

Methods have been proposed to compensate for these false positive results when using pixel level statistics on a local basis. However, when these methods are employed, certain representations of text get lost because of overcompensation in narrowing the criteria for determination of whether a component is text.

In addition, known methods concentrate only on intensities of pixels. These methods do not consider shape as part of the decision as to whether a part of an image is text or a continuous tone region.

The present invention provides a new and improved image processing method which overcomes the above noted problems and difficulties.

SUMMARY OF THE INVENTION

A method is provided for image processing employing a process for segmenting an image that is comprised of text and continuous tone regions. Shapes of components are used as criteria for determining text in the segmentation process.

In one aspect of the invention, a thresholding routine is performed on the image to transform the color image to a black and white image including black and white components, selecting a group of components based on predetermined criteria such as color variance, Hamming distances and alignment, classifying the components of the selected group based on shape and identifying certain components as text based on the classification (i.e. shape recurrence), color, alignment, proximity and relative size.

In another aspect of the invention, the identified text is removed from the image to obtain a background image.

In another aspect of the invention, the identified text is processed.

In another aspect of the invention, the background image is processed apart from the text.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention exists in the construction, arrangement, and combination, of the various parts of the device and steps of the method, whereby the objects contemplated are obtained as hereinafter more fully set forth, specifically pointed out in the claims, and illustrated in the accompanying drawings in which:

DETAILED DESCRIPTION OF THE PREFERRED EMBODIMENTS

Figure 1:
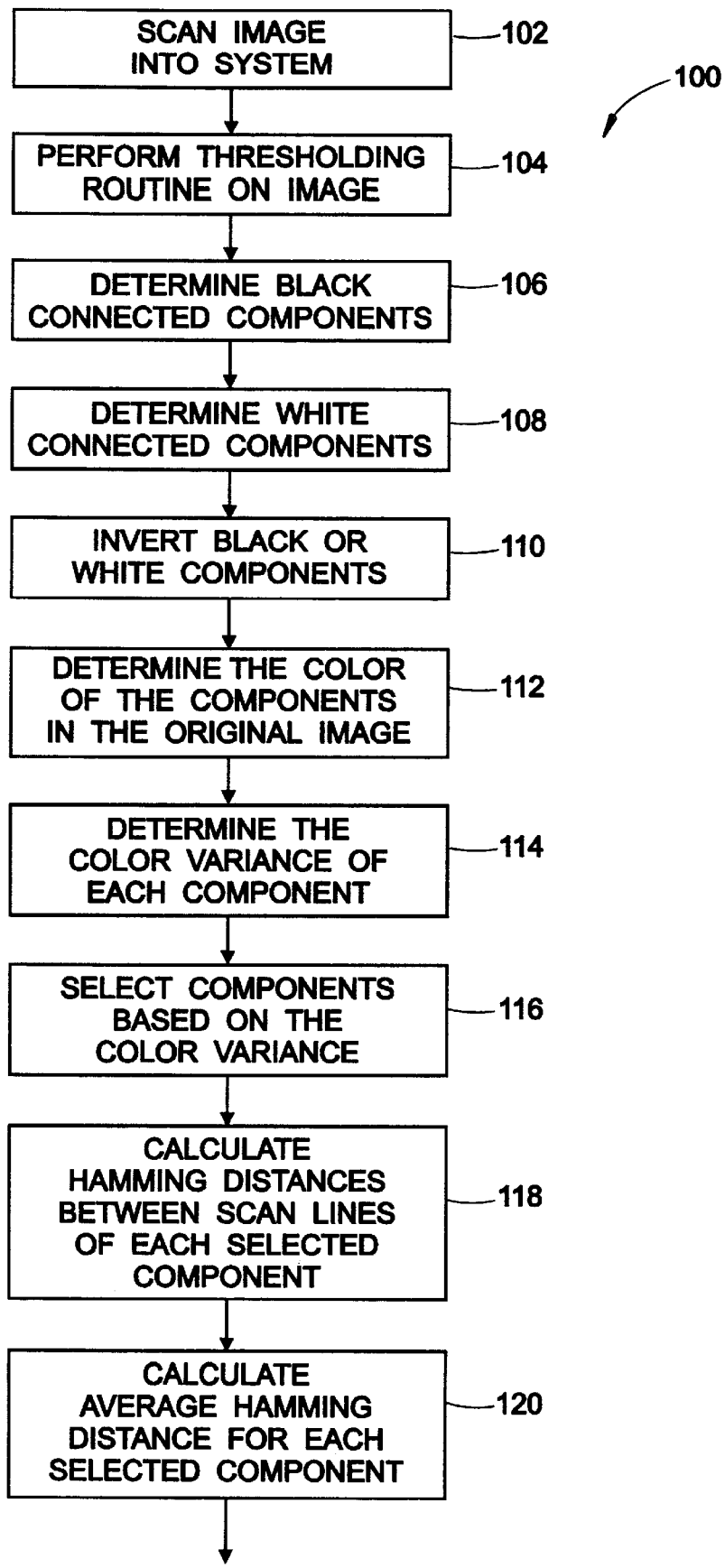
FIG. 1 is a flowchart illustrating the preferred embodiment of the invention.
Figure 1:
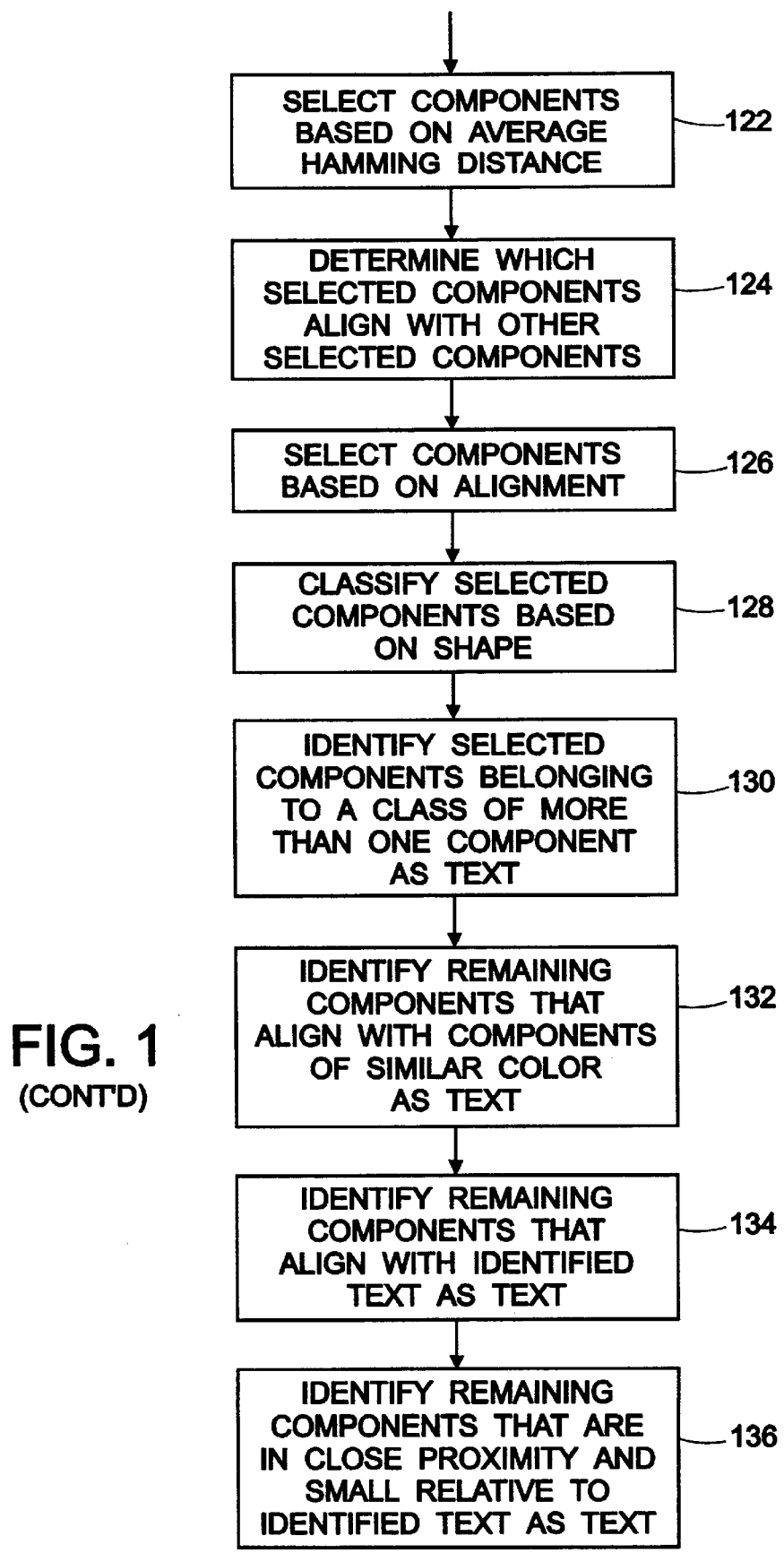

Referring now to the drawings wherein the showings are for purposes of illustrating the preferred embodiments of the invention only and not for purposes of limiting same, FIG. 1 provides a view of the overall preferred method of the present invention. The preferred method is implemented primarily by software techniques; however, any implementations of the essential elements of the invention—whether in software, hardware, other means or a combination—are recognized and contemplated as being within the scope of the invention.

Briefly, the inventors have observed that the appearance of text in images has several distinguishing characteristics:

The text shapes have a high contrast with the surrounding area

Text shapes occur in groups (isolated letters are rare)

The same shapes occur repeatedly

Text shapes close to each other tend to have the same color

The interior color of any given text shape tends to be smooth

These characteristics, as well as others, serve as the basis for the preferred method of segmenting the image based on the shape of image components.

Referring back to FIG. 1, the method 100 begins with the scanning of an image (step 102). It should be recognized that when an image is scanned into a system, such as the exemplary system described herein in connection with FIG. 6, the image is transformed into a bitmap that corresponds to a pixel array. For ease of reference, the term "image" will be used herein to refer to the original image and the scanned image or resulting bitmap.

A local thresholding routine is then performed to transform the image to a black-and-white image (step 104). Although well known in the art, adaptive thresholding routines typically analyze a local area (e.g. a square or rectangular window) around a pixel to determine if it should be colored black or white. The variation or contrast of the pixels in the area is computed (e.g. a histogram may be created). Based on this data, a threshold value is computed. Pixels having values below the threshold value are deemed to be black and pixels having values above the threshold value are deemed to be white. This process is accomplished a plurality of times over the image. This creates the high contrast necessary for the text to be readable to segment it from the background. Of course, the thresholding algorithm also picks up a large number of non-text features from high-contrast regions of the background.

Next, black and white connected components in the threshold image are determined (steps 106 and 108). Determining connected components may be accomplished by a variety of well known techniques. These components contain both the dark-on-light and light-on-dark text. Either the white connected components or the black connected components are inverted so that the two forms have the same representation (step 110). In one embodiment, white connected components are inverted. A light-on-dark instance of a certain character in this binary representation should now look the same as a dark-on-light instance of the same character. In this binary representation, a foreground pixel is now always black regardless of whether it was originally darker or lighter than the background.

The color of each component is determined by analyzing the original color image (step 112). It should be recognized that, if the component is of sufficient size, only the interior pixels should be considered to determine color. The reason is that edge pixels may be contaminated by background in the image. The color over all of the foreground pixels of each component is then averaged to determine color variance (step 114). Components with a color variance under a predetermined threshold are selected (step 116). Components with a large color variance, i.e. over the predetermined threshold, are thrown away as these are unlikely to be text.

For each remaining component, the Hamming distances between each two consecutive scan lines is calculated (step 118). The Hamming distance is the count of the number of bits that are different between the two lines. The average Hamming distance per component is also calculated (step 120). Components with an average Hamming distance below a predetermined threshold are selected (step 122). Components with an average Hamming distance that is too large, i.e. above the predetermined threshold, are discarded. That is, this step rejects noise components, which do not have a coherent shape. This use of Hamming distance takes advantage of the characteristic of text that consecutive scan lines in text do not differ greatly in any single component of text, e.g. a letter.

It is then determined which components align with (i.e., are close to) other components of about the same height (step 124). These components are then selected (step 126). The idea is to find groups of components that look like words.

These are initial "guesses" of text. Such components are then classified, or run through a tokenizer (step 128). The tokenizer identifies components that have almost identical shapes and marks them as such. It also marks unique components, or components that do not have the same shape or nearly the same shape as any other components, as "singletons". Accordingly, components are placed in classes.

The process of symbol, or component, classification as performed in the currently preferred embodiments, i.e. step 128 of FIG. 1, is described with reference to FIGS. 2 and 3. The process is also described in U.S. application serial No. 08/655,546, filed May 30, 1996 (incorporated herein by reference).

Figure 2:
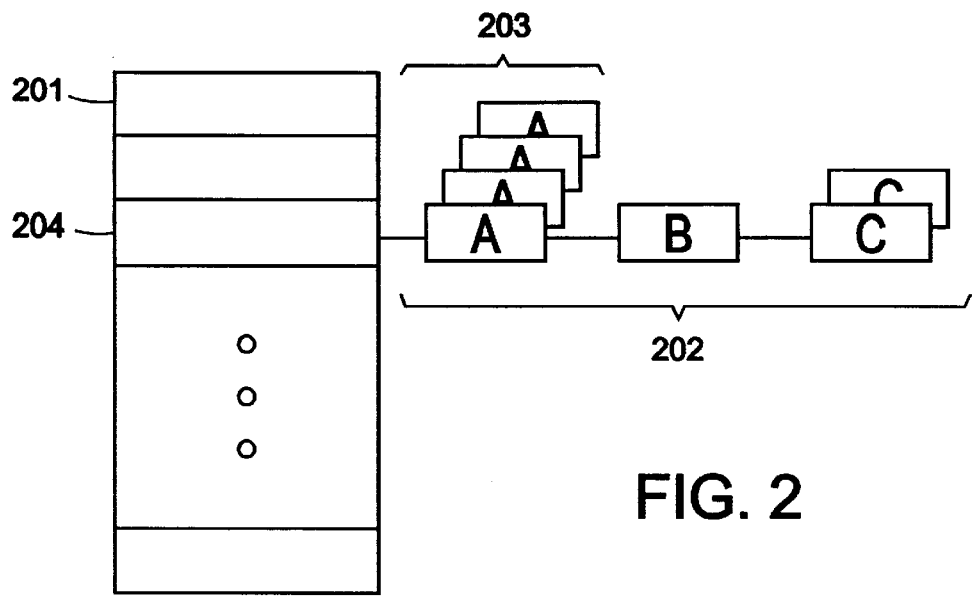
FIG. 2 illustrates a table used in the implementation of the present invention.

FIG. 2 is a block representation of a data structure referred to herein as a symbol dictionary used for the matching process of the currently preferred embodiment. Referring to FIG. 2, a table 201 has contents which are indexed by the dimensions of the bounding box of a symbol. Each table entry, e.g. table entry 204, may refer to (i.e. point to) one or more equivalence classes 202 that are linked together via a linked data structure. Each equivalence class 202 is comprised of another linked list of instances of the symbol 203 in the class. Each instance of the symbol is represented by a data structure containing position information on the medium where the instance can be found, a bitmap of the instance and information identifying a "best match position". As will be described in greater detail below, the best match position indicates a possible shifted position where the instance best matches the exemplar for the class.

In the currently preferred embodiment, the table 201 is a hash table. A hash table is a well known structure wherein a "many to few" mapping occurs using a random function that returns results modulo the size of the hash table. This property is used in order to maintain and access linked lists of symbols that are of the same dimensions. A linked list is a well known structure wherein an instance of a node in the list points to the next node in the list. It should be noted that the data structure illustrated in FIG. 2 is not intended to limit the scope of the present invention. Use of alternative data structures to support the organization of equivalence classes and comparisons thereto would not cause departures from the spirit and scope of the present invention.

The symbol dictionary illustrated in FIG. 2 is a dynamic structure that is used to enable reference to potential symbol matches. The flowchart of FIG. 3 describes the matching process with respect to using the symbol dictionary. First, a hashing function is performed on the dimensions (i.e. width and height) of the extracted symbol to find the hash table entry containing potential matches, step 301. The entry is examined to determine if there is an equivalence class to check, step 302. The entry has equivalence classes to examine if it is not empty and if the linked list has not already been completely traversed in prior matching attempts. When an equivalence class is identified, it is then determined if the extracted symbol and the exemplar for the equivalence class match, step 303. The exemplar for an equivalence class is either of 1) the symbol that caused equivalence class to be created, or 2) an average symbol created in the course of "committing" an equivalence class (described below). The details of comparing symbols is described in detail below. In any event, if a match occurs with one of the exemplars in the linked list, then the symbol is added to the corresponding equivalence class, step 304. Adding the symbol to the equivalence class involves adding it to the data structure for the equivalence class. If no match occurs the linked list is further traversed, step 305, and a determination is made if there is another equivalence class to compare per step 302.

If there are no longer any equivalence classes in the linked list for the current symbol table entry, a check is made to determine if all similar sized equivalence classes have been checked, step 306. If not, the size parameters used to determine a hash table entry is modified to one of similar size and a new table entry is assessed per step 301. If all similar size equivalence classes have been checked, a new equivalence class is created per step 307. The new equivalence class is placed in the symbol dictionary within the linked list structure of the table entry corresponding to the original size of the extracted symbol.

Two other steps are performed during the course of symbol classification and should be viewed as symbol dictionary management. One is committing and the other is equivalence class merging. Committing is a process that is invoked when a predetermined number (e.g. 10) of extracted symbols become part of an equivalence class, The commit process is one where an averaged equivalence class exemplar is finalized, i.e. the bitmap representing the class is committed to. Prior to this step, the equivalence class exemplar was merely the first symbol that caused the creation of the class. The averaged class exemplar is a more accurate representation of all the symbols in the class. This is accomplished by "averaging" the bitmaps representing symbols that are members of the class. The averaging is accomplished by maintaining a histogram which contains a count of the number of the members of the class (at their "best match" alignment) that have "on" pixels at each of the different pixel locations. The exemplar is generated by thresholding this histogram, i.e. in the final exemplar the pixel will be "on" if the corresponding pixel location exceeds a predetermined threshold. The threshold is chosen so that the number of "on" pixels in the exemplar is as close as possible to the median number of "on" pixels in the members of the class.

Once the final exemplar is generated, all the symbols are checked to see that they match the averaged class exemplar. This checking uses the same matching criteria described above. Those symbols that do not match the averaged class exemplar are removed from the equivalence class and are treated as newly extracted symbols (i.e. they are matched against existing equivalence classes, etc.).

Besides providing a more accurate class exemplar, averaging facilitates the overall comparison process by freeing up memory resources occupied by the bitmaps of the class members.

Merging is a process where equivalence class exemplars are compared in order to determine if they can be merged (i.e. combined). Merging is desirable because it reduces the total number of equivalence classes. Reducing the number of equivalence classes results in improved performance. In the currently preferred embodiment, merging happens as a second pass after all the symbols have been processed and equivalence classes created. However, it could also be performed at various checkpoints in the process (e.g. after each page of a multi-page document being processed). The merging process is merely one where the matching processes described above are applied to the set of class exemplars, and two classes are combined if therein exemplars match.

The matching technique (e.g. step 303 of FIG. 3) of the currently preferred embodiment is an improved Hausdorff-like method. The comparison of two symbols is bidirectional. Suppose that two bitmaps, A and B, are to be compared to determine whether they represent two instances of the same shape. Each bitmap contains a number of points that are turned on ("black" points) against a background of points that are "off" ("white" points).

For the purposes of matching, two new bitmaps are computed $A^\delta$ and $B^\delta$, which are dilated versions of the original bitmaps. In the currently preferred embodiment, the dilation is topology preserving, i.e. the local connectedness is the same as the originals, but the boundaries of the symbol are thickened slightly. The dilated versions represent a tolerance for acceptable "noise" resulting from the quantization and other effects that may perturb the boundaries of the symbols. The test is then to see if most of the black points in A lie inside the shape of $B^\delta$, and if most of the black points in B lie inside the shape $A^\delta$. If both of these tests are passed, then it is concluded that A and B represent the same shape (i.e. they match).

The rationale behind this test lies in a model of the printing and scanning process; if A and B represent the same symbol (or have the same shape), then their boundaries should (for the most part) match. However, since the scanning process is one of the sampling points at a predetermined density, each symbol's boundary could have shifted by a pixel or two because the pixel grid performing the sampling. Thus, if the boundary of A lies close to the boundary of B, then A will lie within $B^\delta$ (since it is a bit thicker) and vice versa. It should be noted that both directions of the test are necessary since using only one direction may yield erroneous matches when one symbol resembles a subset of the other symbol, e.g. the letter "O" and the letter "Q".

The manner in which the comparison is made is described with reference to the following example. In this example, bitmap A is compared to bitmap B, i.e. does B fit inside of A to within some tolerances? If this can be answered in the affirmative, the identical steps are performed for the "other" side, i.e. does A fit inside B?. The steps for determining a match are described in the flowchart of FIG. 4. For the sake of brevity, only one side of the comparison is described.

Figure 4:
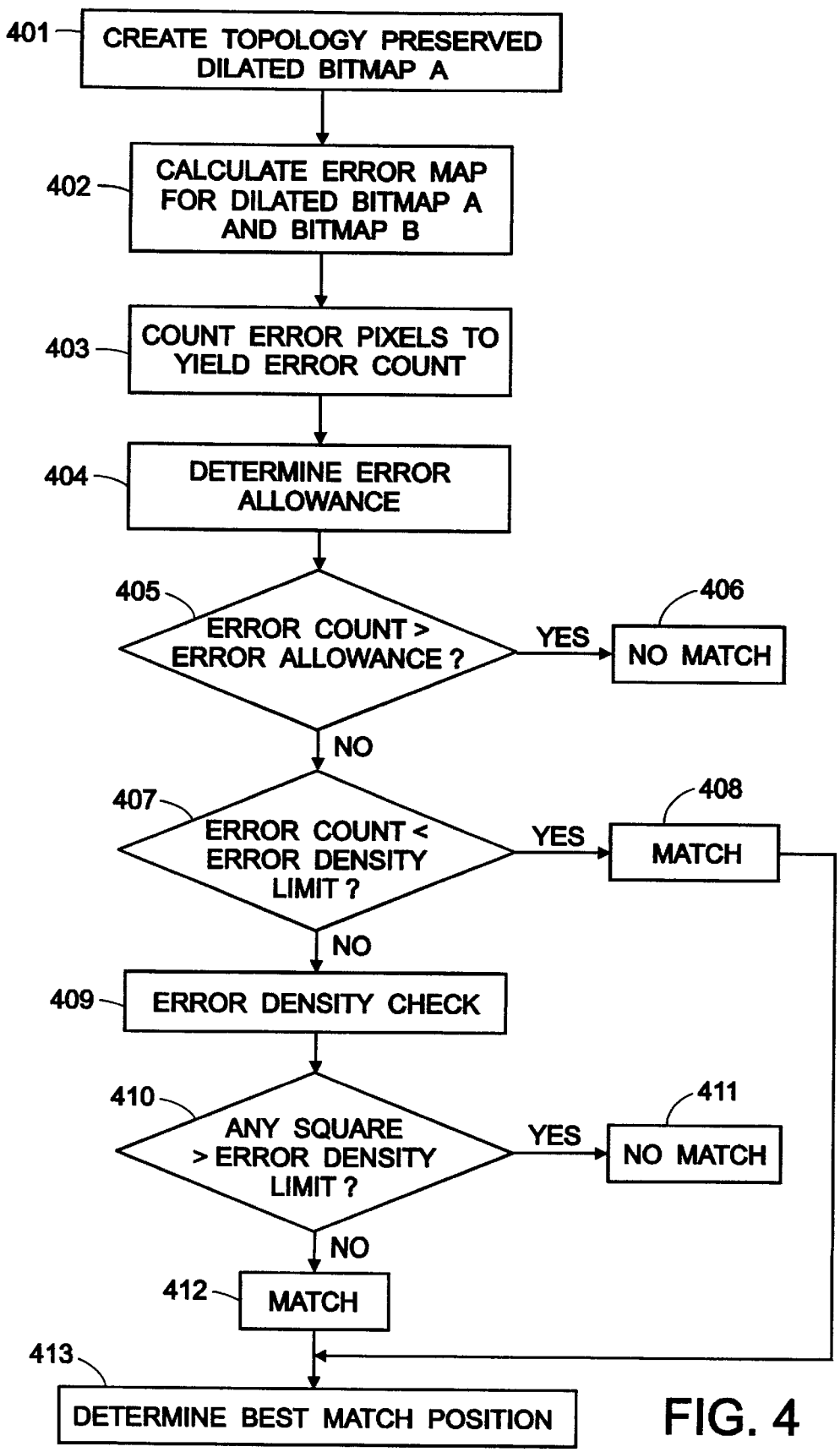
FIG. 4 is a flowchart illustrating a symbol matching method.

Referring to FIG. 4, a topology preserving dilation is performed on bitmap A to create a dilated representation of the symbol in bitmap A (referred to as dilated bitmap A), step 401. The steps for performing such a dilation are described in, for example, U.S. application Ser. No. 08/655,546 entitled "Method and Apparatus for Comparing Symbols Extracted from Binary Images of Text", filed May 30, 1996. An error bitmap is then calculated for dilated bitmap A and bitmap B, step 402. The error bitmap indicates "on" pixels in bitmap B that are not present in dilated bitmap A. In the currently preferred embodiment, the error bitmap is with respect to a dilated bitmap A and is calculated by first inverting the values of dilated bitmap A (i.e. converting 1s to 0s and vice versa) and then performing a logical AND function with bitmap B. The result is that the error pixels having a 1 value indicate where bitmap B does not fit inside dilated bitmap A. Also, it should be noted that each bitmap is represented so that its origin lies at the upper left hand corner. It is based on this alignment that the logical AND is performed on corresponding pixels. It is also worth noting that the error bitmap generated herein is different from an error bitmap of the prior art (typically an exclusive OR (XOR) of the two bitmaps)). A simple XOR would not work in the present invention because XOR would have created an error pixel of value 1 not only where bitmap B doesn't fit in dilated bitmap A, but also where dilated bitmap A is not overlapping with bitmap B. The number of error pixels in the error bitmap having a value of 1 are then counted yielding an error count, step 403.

An error allowance is then determined based on the size of the symbol contained in bitmap B, step 404. This error allowance defines a threshold for errors that takes into account the effects of noise and other quantization effects. In the currently preferred embodiment, the error allowance is determined based on a nonlinear function having the properties that there is no allowance for small symbols and a proportionately larger allowance for large symbols. Calculation of the error allowance is described in greater detail below. It is then determined if the error count is greater than the calculated error allowance, step 405. If the error count is greater than the error allowance, then bitmap B does not fit inside dilated bitmap A to within the allowed tolerance, and there is no match, step 406. Otherwise, the error count is compared to an error density limit, step 407. The error density limit is a threshold amount for identifying close groupings of "on" error pixels. In the currently preferred embodiment the error density limit is 3. If a check involving the error pixels and the error density limit (described below) passes, then there is a match, i.e. bitmap B does fit inside dilated bitmap A, step 408. Processing would then proceed to step 413 to determine a best match position (described in more detail below).

If the error count is greater than the error density limit, then the error density check is performed. Here, the error bit map calculated in step 402 is examined in 3×3 square increments in order to detect excessive groupings of "on" error pixels, steps 409. A determination is made if any 3×3 square exceeds the error density limit, step 410. If any 3×3 square exceeds the error density limit, there is no match, step 411. If it is determined that no 3×3 square exceeds the error density limit, then there is a match, step 412.

When both directions are tested and a match is determined, it has been determined that for symbol classification embodiments that a "best match" position be identified, step 413. The "best match" position is defined as the position relative to the equivalence class exemplar, that yields the fewest errors when two bitmaps are compared. As noted above, each bitmap is oriented on a coordinate system having the upper left hand corner as the origin. The comparison described with reference to FIG. 4 is performed assuming that the origins of each bitmap are perfectly aligned. However, this alignment may not yield the best match. In the currently preferred embodiment, the bitmap corresponding to the extracted symbol is shifted relative to the origin and the matched bitmap in order to find the location where the most "on" pixels are aligned. This is performed by shifting, performing a logical AND function between the two bitmaps and counting the number of "on" pixels in the result. The shifted position with the most "on" pixels is the "best match" location. This location is saved with the bitmap. It is desirable to identify this best match location because it facilitates the generation of the most accurate "final" representation of an equivalence class when an equivalence class is committed.

Figure 3:
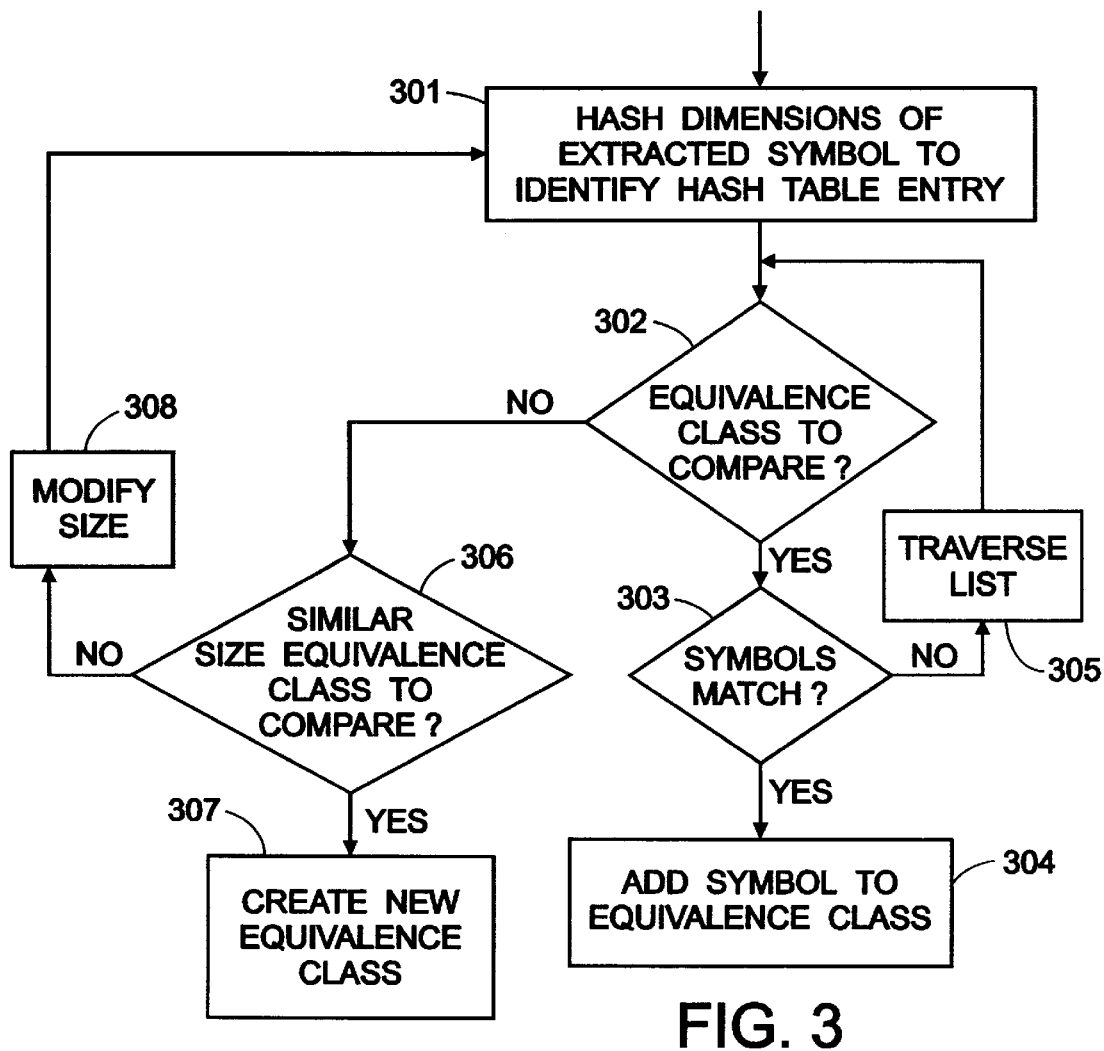
FIG. 3 is a flowchart illustrating a classification method.

Referring back to FIG. 1, once components are classified according to the methods of FIGS. 2–4, non-singleton components (or symbols), or components that belong to a class of more than one component, are identified as text (step 130). Text characters are likely to occur more than once in a document, and other shapes are unlikely to repeat.

Remaining unidentified components that align with, or are in close proximity to, other components of close color are identified as text (step 132). The colors, of course, were previously determined in steps 112–114. Still unidentified components that align with any components marked as text by the above procedures are also identified as text (step 134). Last, unidentified components that are close to a text component and small relative to it are identified as text (step 136). It will be appreciated that this procedure identifies as text the following examples: dots, commas, "I" dots, and accents.

Figure 5:
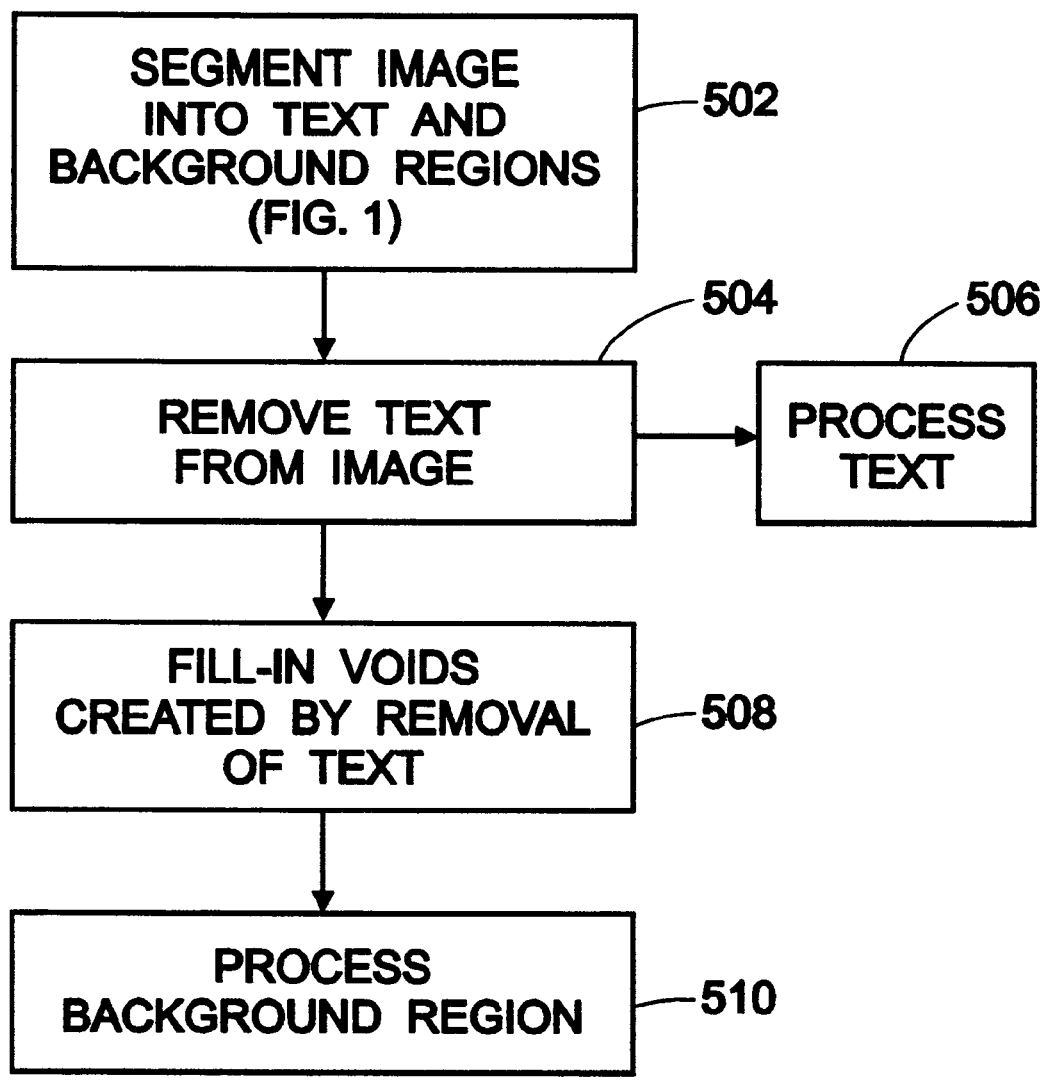
FIG. 5 is a flowchart illustrating image processing after the method of FIG. 1 is complete; and, FIG. 6 is a block diagram of an exemplary system according to the present invention.

Referring now to FIG. 5, once these steps have been taken (step 502), the components that have been identified as text can be removed from the background image (step 504) and the resulting holes in the background image are filled by using some method that produces local smoothness, such as the grayscale dilation routines (step 508). Such a method is referenced in, for example, L. Vincent, "Morphological Algorithms", Harvard Robotics Laboratory, Technical Report No. 91-12 (1991), which is incorporated herein by reference. This greatly reduces the amount of high spatial frequencies in the background; the background can now be compressed to a greater degree with a smaller amount of "ringing" than before the text was removed. The text and background regions can then be suitably processed as desired (steps 506 and 510).

In addition, the colors of each text shape can now be clustered to reduce the number of unique colors. It is expected that the actual number of text colors is small, so shapes having similar colors will be assigned exactly the same color. These colors can be sorted along with the text shapes in some token-based image representation such as DigiPaper described in the documents incorporated herein by reference.

The preferred embodiment shows implementation of the method on only a single image; however, the preferred embodiment is not so limited. Applying this technique to a group of images drawn from the same document will provide even better results than treating each image separately. That is, infrequent text shapes (such as the letter "Q")

occur more times in a larger corpus, so the accuracy of the text/nontext decision is increased because fewer singletons are encountered.

Figure 6:
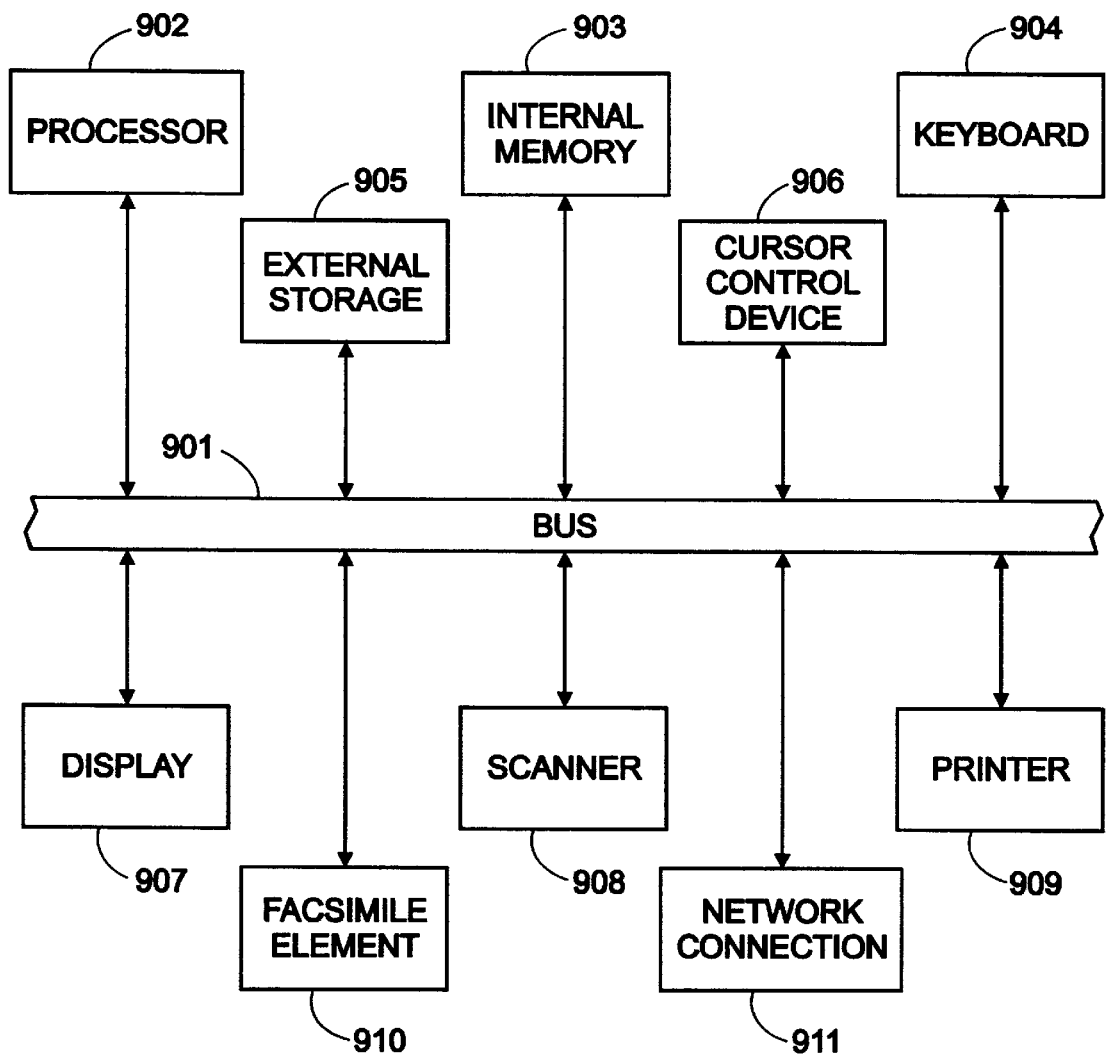

The computer based system on which the currently preferred embodiment of the present invention may be used is described with reference to FIG. 6. As shown, the computer based system is comprised of a plurality of components coupled via bus 901. The bus 901 illustrated here is simplified in order not to obscure the present invention. The bus 901 may consist of a plurality of parallel buses (e.g. address, data and status buses) as well as a hierarchy of buses (e.g. a processor bus, a local bus and an I/O bus). In any event, the computer system is further comprised of a processor 902 for executing instructions provided via bus 901 from Internal memory 903 (note that the Internal memory 903 is typically a combination of Random Access or Read Only Memories). Such instructions are those that are preferably implemented in software for carrying out the processing steps outlined above in the flowcharts of FIGS. 1–5. The processor 902 and Internal memory 903 may be discrete components or a single integrated device such as an Application Specification Integrated Circuit (ASIC) chip. Further the combination of processor 902 and Internal Memory 903 comprise circuitry for performing the functionality of the present invention.

Also coupled to the bus 901 are a keyboard 904 for entering alphanumeric input, external storage 905 for storing data such as a compressed text image data file, a cursor control device 906 for manipulating a cursor, and a display 907 for displaying visual output. The keyboard 904 would typically be a standard QWERTY keyboard but may also be telephone like keypad. The external storage 905 may be fixed or removable magnetic or optical disk drive. The cursor control device 906 will typically have a button or switch associated with it to which the performance of certain functions can be programmed. Further coupled to the bus 901 is a scanner 908. The scanner 908 provides a means for creating a bit mapped representation of a medium (i.e. a scanned document image).

Optional elements that could be coupled to the bus 901 would include printer 909, facsimile element 910 and network connection 911. The printer 909 could be used to print the bitmapping representation. The facsimile element 910 may contain an element used to transmit a image data that has been compressed using the present invention. Alternatively, the facsimile element 910 could include an element for decompression of a document image compressed using the present invention. The network connection 911 would be used to receive and/or transmit data containing image data. Thus, the image data utilized by the present invention may be obtained through a scanning process, via a received fax or over a network.

The above description merely provides a disclosure of particular embodiments of the invention and is not intended for the purpose of limiting the same thereto. As such, the invention is not limited to only the above described embodiments. Rather, it is recognized that one skilled in the art could conceive alternative embodiments that fall within the scope of the invention.

Having thus described the invention, we hereby claim:

1. A method for processing an image including text and continuous tone regions, the method comprising the steps of:
performing a thresholding routine on the image to transform the image to a second image comprising components representing high contrast regions of the image;
determining which components have connected black pixels to obtain a first group of components;
determining which components have connected white pixels to obtain a second group of components;
inverting one of the first and second groups of components to obtain a third group of components including both groups;
determining a color of each component based on the image;
determining a variance of color of each component;
selecting a fourth group of components from the third group based on the determination of the variance of color whereby components having variance of color under a predetermined threshold are selected;
calculating Hamming distances between scan lines of each component of the fourth group;
calculating an average Hamming distance for each component of the fourth group;
selecting a fifth group of components based on the average Hamming distances whereby components having an average Hamming distance under a predetermined threshold are selected;
determining which components align with other components;
selecting a sixth group of components from the fifth group based on the determination of alignment;
classifying the components of the sixth group according to shape to obtain classes of components;
identifying components of the sixth group belonging to a class of more than one component as text;
identifying unidentified components of the sixth group that align with components of similar color as text;
identifying unidentified components of the sixth group that align with the identified text as text; and,
identifying unidentified components of the sixth group that are in close proximity to the identified text and relatively small in comparison to the identified text as text.

2. The method according to claim 1 further comprising:
removing the identified text from the image to obtain a background image.

3. The method according to claim 2 further comprising:
processing the text; and,
processing the background image.

4. A method for processing an image including text and continuous tone regions, the method comprising the steps of:
performing a thresholding routine on the image to transform the image to a second image comprising components representing high contrast regions of the image;
selecting a group of the components based on color variances, Hamming distances and alignment;
classifying the components of the selected group according to shape to obtain classes of components;
identifying components of the selected group belonging to a class of more than one component as text;
determining which components have connected black pixels to obtain a first group of components;
determining which components have connected white pixels to obtain a second group of components;
inverting one of the first and second groups of components to obtain a third group of components including both groups;
determining a color of each component based on the image;

determining a variance of color of each component;

selecting a fourth group of components from the third group based on the determination of the variance of color whereby components having variance of color under a predetermined threshold are selected;

calculating Hamming distances between scan lines of each component of the fourth group;

calculating an average Hamming distance for each component of the fourth group; and, selecting a fifth group of components based on the average Hamming distances whereby components having an average Hamming distance under a predetermined threshold are selected.

5. The method according to claim 4 further comprising:

identifying unidentified components of the selected group that align with components of similar color as text.

6. The method according to claim 5 further comprising:

identifying unidentified components of the selected group that align with the identified text as text.

7. The method according to claim 6 further comprising:

identifying unidentified components of the selected group that are in close proximity to the identified text and relatively small in comparison to the identified text as text.

8. The method according to claim 4 wherein the selecting further comprises:

determining which components align with other components; and, selecting a sixth group of components from the fifth group based on the determination of alignment.

9. The method according to claim 4 further comprising:

removing the identified text from the image to obtain a background image.

10. The method according to claim 9 further comprising:

processing the text; and, processing the background image.

11. An apparatus for processing an image including text and continuous tone regions, the apparatus comprising:

means for performing a thresholding routine on the image to transform the image to a second image comprising components representing high contrast regions of the image;

means for selecting a group of the components based on color variances, Hamming distances and alignment;

means for classifying the components of the selected group according to shape to obtain classes of components;

means for identifying components of the selected group belonging to a class of more than one component as text;

means for identifying unidentified components of the selected group that align with components of similar color as text;

means for identifying unidentified components of the selected group that align with the identified text as text;

means for identifying unidentified components of the selected group that are in close proximity to the identified text and relatively small in comparison to the identified text as text;

means for determining which components have connected black pixels to obtain a first group of components;

means for determining which components have connected white pixels to obtain a second group of components;

means for inverting one of the first and second groups of components to obtain a third group of components including both groups;

means for determining a color of each component based on the image;

means for determining a variance of color of each component;

means for selecting a fourth group of components from the third group based on the determination of the variance of color whereby components having variance of color under a predetermined threshold are selected;

means for calculating Hamming distances between scan lines of each component of the fourth group;

means for calculating an average Hamming distance for each component of the fourth group; and, means for selecting a fifth group of components based on the average Hamming distances whereby components having an average Hamming distance under a predetermined threshold are selected.

12. The apparatus according to claim 11 further comprising:

means for removing the identified text from the image to obtain a background image.

13. The apparatus according to claim 12 further comprising:

means for processing the text; and, means for processing the background image.

14. The apparatus according to claim 11 wherein the means for selecting further comprises:

means for determining which components align with other components; and, means for selecting a sixth group of components from the fifth group based on the determination of alignment.

* * * * *